United States Patent [19]

Nakagawa et al.

[11] 4,268,219

[45] May 19, 1981

[54] GREEN TIRE CONVEYING METHOD AND APPARATUS

[75] Inventors: Kazuhiko Nakagawa, Kobe; Yasuhiko Fujieda, Akashi; Shozo Hara, Kobe; Toshikazu Tanaka, Kobe; Akira Taira, Kobe, all of Japan

[73] Assignee: Kobe Steel, Limited, Kobe, Japan

[21] Appl. No.: 956,977

[22] Filed: Nov. 2, 1978

Related U.S. Application Data

[63] Continuation-in-part of Ser. No. 678,755, Apr. 21, 1976, abandoned.

[30] Foreign Application Priority Data

Apr. 21, 1975 [JP] Japan .................................. 50-48992
Apr. 25, 1975 [JP] Japan .................................. 50-51157

[51] Int. Cl.³ ............................................. B65H 1/00
[52] U.S. Cl. .................................. 414/786; 414/222; 414/282
[58] Field of Search .................... 425/29, 38, 30; 264/40.1; 29/563, 33 P; 414/786, 282, 222, 273

[56] References Cited

U.S. PATENT DOCUMENTS

| | | | |
|---|---|---|---|
| 2,902,945 | 9/1959 | Simon | 104/88 |
| 2,941,739 | 6/1960 | Burke et al. | 242/181 |
| 2,988,237 | 6/1961 | Devol, Jr. | 414/134 |
| 3,067,457 | 12/1962 | Dennis et al. | 414/286 |
| 3,279,624 | 10/1966 | Devol | 414/744 A |
| 3,550,196 | 12/1970 | Gazuit | 425/29 |
| 3,595,412 | 7/1971 | Billingsley et al. | 414/786 |
| 3,719,287 | 3/1973 | Billingsley et al. | 414/273 |
| 3,777,908 | 12/1973 | Keller | 212/127 |

Primary Examiner—Lawrence J. Oresky
Attorney, Agent, or Firm—Oblon, Fisher, Spivak, McClelland & Maier

[57] ABSTRACT

A conveying method for conveying green tires from storing devices, disposed near building machines, to curing machines and attaching them to the curing machines is disclosed wherein a green tire delivery demand signal is emitted, from a specific curing machine among a plurality of curing machines, to a control system which stores the corresponding relationships between the respective storing devices and the respective curing machines and the quantities and kinds of green tires stored in the storing devices. The control system which receives this demand signal sends a signal, indicating the curing machine which has emitted the demand signal and the corresponding specific storing device, to an automatic truck supporting and carrying thereon a mechanism which is capable of withdrawing a green tire from the storing device, having it suspended thereon, and loading it onto the curing machine. The automatic truck is capable of running on rails laid and supported at a suitable height above the storing devices and curing machines, and on receipt of this signal, the truck moves to the corresponding storing device, carries the green tire suspended thereon, runs to the specific curing machine, which has emitted the demand signal, while suspending the green tire thereon, and loads the green tire onto the specific curing machine.

6 Claims, 13 Drawing Figures

GREEN TIRE CONVEYING METHOD AND APPARATUS

This is a continuation-in-part of copending application Ser. No. 678,755, filed Apr. 21, 1976, now abandoned.

BACKGROUND OF THE INVENTION

1. Field of the Invention

The present invention relates generally to conveying methods, and more particularly to a method and apparatus for conveying green tires from tire building machines to tire curing machines.

2. Description of the Prior Art

In the conventional tire-manufacturing process, in case various cylindrical green tires shaped by various tire building machines are attached to curing machines, the green tires are conveyed by a vehicle or hook conveyor, before the curing machine green tires suitable for this curing machine are withdrawn from the conveying means by man power, and a prescribed number of green tires are stored prior to insertion within the curing machine. The curing machines are divided into two types, namely, one type provided with a so-called vertical loader for loading green tires, and the other type that is not provided with a vertical loader. In the former type, the green tires stored prior to insertion within the curing machine are delivered into a receiving plate of the vertical loader by man power, and in the latter type, the green tires are directly delivered to the curing machine by manpower.

As a system for performing the above operation automatically, a green tire shaping and curing line as shown in FIG. 1 has been proposed. According to this proposal, on one side of a green tire conveying line d, including a hook conveyor having a shape of long, connected rectangles, there is disposed, in series, a suitable number of various tire building machines a together with corresponding storing devices b and loading devices c for loading green tires onto the hook conveyor line d. On the other side of the green tire conveying line d, there is disposed, in series, various curing machines e for curing the green tires. One green tire charging device f is disposed for each curing machine e.

In the above processing line, it is necessary to provide one loading device c for each storing device b and one charging device f for each curing device e. Accordingly, the entire system becomes complex. The green tire g is suspended horizontally by a hook mounted on the conveying line d as shown in FIG. 2, and the green tire g is conveyed in this horizontally suspended state. Therefore, this conveying system is defective in that in the charging device f for charging green tires into the curing machine e, there must be provided a mechanism for turning the green tire by 90°.

Furthermore, since even empty hook conveyors must also be operated, the power expenses become large, and since the entire hook conveyors are suspended on an endless conveyor line, if the desired hook passes the corresponding curing machine, it must make one whole one round trip, for which a considerable time for awaiting the hook is required.

SUMMARY OF THE INVENTION

The present invention has been completed as a result of our research work made with a view to overcoming the foregoing defects involved in the conventional technique. Namely, it is a primary object of the present invention to provide a conveying method in which vertical loaders, capable of suspending thereon green tires, are mounted on an automatic device capable of automatically running between storing devices and curing machines, and this automatic conveying truck automatically performs the withdrawal of green tires from the storing devices and the loading of the same upon the curing machine.

In the tire manufacturing process, various stations such as those for the inspection of the green tires, coating of a parting agent, pre-heating of the green tires, and boring of the green tires for leakage of melting air, are disposed between the building machines and the curing machines. Another object of the present invention is to increase the manufacturing efficiency by controlling all of these intermediate steps by one control system.

In accordance with the present invention, there is provided a conveying method for conveying green tires, from storing devices disposed near building machines, to curing machines and loading them onto the curing machines, wherein a green tire delivery demand signal is emitted, from a specific curing machine among a plurality of the curing machines, to a control system which stores the corresponding relationships between the respective storing devices and the respective curing machines, and the quantities and kinds of green tires stored in the storing devices. The control system which receives this demand signal sends a signal, indicating the curing machine which has emitted the demand signal and the corresponding specific storing device, to an automatic truck supporting and carrying thereon a mechanism having the function of withdrawing a green tire from the storing device, suspending it thereon, and loading it onto the curing machine. The automatic truck is capable of running on rails laid and supported at a suitable height above the storing devices and curing machines, and on receipt of this signal, the automatic truck moves to the corresponding storing device, carries the green tire suspended thereon, goes to the specific curing machine which has emitted the demand signal while suspending the green tire thereon, and loads the green tire onto the specific curing machine.

More specifically, the rails have the form of a closed loop, and an automatic truck stand-by station is disposed along one of the rails between the building machines and curing machines while an inspection station and a coating device are disposed along the other rail. The process steps between the building machines and curing machines are thus performed automatically whereby, if the green tire is a defective one, the automatic truck carrying this defective green tire thereon is delivered to a defective tire storing station through branched rails and simultaneously, the defective tire suspending position and the attachment position are detected by a sensor which issues a demand signal, for another green tire of the same size to be sent to the prescribed curing machine, to the control system, whereby the manufacturing efficiency is increased.

The apparatus of the present invention comprises rails connecting the building machines with the curing machines, at least one automatic truck running on the rails and having the function of suspending the green tires thereon, conveying the green tires, and loading them onto the curing machine, a control system for controlling the movements of the automatic truck, and green tire storing devices disposed between the rails and the building machines. The automatic truck carries thereon a green tire, which has been prepared in the building machine and stored in the storing device, and it comprises a vertical loader for loading the green tire onto the curing machine, which includes paddle trolley assemblies or link mechanisms, a mechanism for supporting the vertical loader so that it can be moved in the vertical direction, means for driving the automatic truck, and a control device for controlling the vertical loader, the supporting mechanism, and the driving means in response to the control system. The control system includes a setting panel for determining the correspondence between the curing machine and the building machine according to the tire size, a memory device for storing the quantities and kinds of stored green tires, a call-up time setting panel, a logging typewriter, and a centralized controller.

As noted hereinbefore, the present invention is characterized in that an automatic truck capable of supporting a green tire thereon, conveying the green tires in the supported state and attaching the green tire onto the curing machine is adopted in the tire manufacturing process and each of these operations of the automatic truck is controlled by a control system. By virtue of this characteristic feature, the foregoing defects involved in the conventional technique can be overcome and the above-mentioned objects can be attained sufficiently in the present invention.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE ILLUSTRATED EMBODIMENTS

The present invention will now be described in detail by reference to the embodiments shown in the accompanying drawings.

Figure 1:
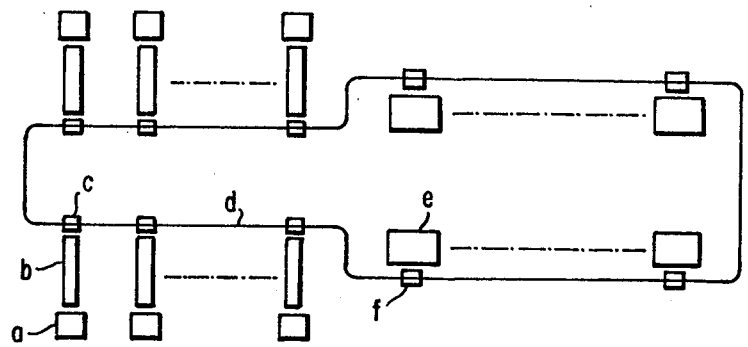
FIG. 1 is a schematic diagram illustrating an example of the conveying system in the conventional line for building and curing green tires.
Figure 2:
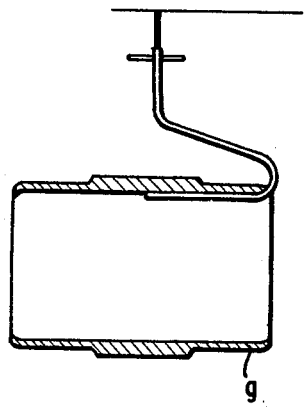
FIG. 2 is a partial sectional view illustrating an example of the hook conveyor used in the conveying system shown in FIG. 1.
Figure 3:
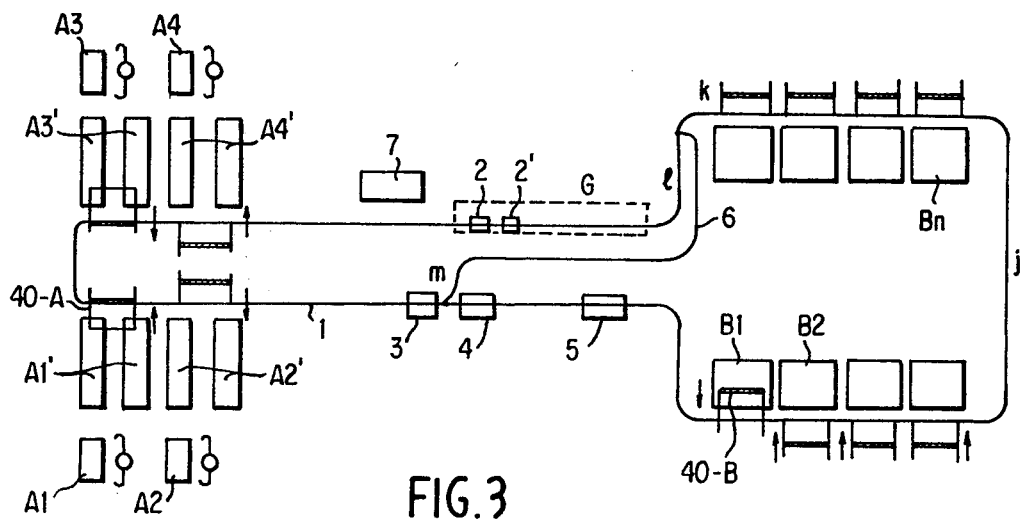
FIG. 3 is a schematic diagram illustrating an example of the conveying system according to the present invention.

FIG. 3 illustrates the system of supporting, conveying and loading green tires, with which the present invention is concerned, and building machines A1, A2, A3, A4, ..., Aj, ... An for shaping various green tires differing in size and corresponding tire storing devices A1', A2', ..., Aj', ... An' are interposed between the building machines and conveying line 1.

Green tires are transported to the conveying line 1 from the storing devices A1', A2', ... by means of automatic trucks 2, 2', ... which will be described in detail hereinafter.

The green tire withdrawn from the storing device is first forwarded to the inspection station 3 by means of the automatic truck 2, and it is then passed through a coating device 4 and a preheater 5, and conveyed and attached to the prescribed curing machine, among the curing machines B1, B2, ..., Bj, ... Bn, having molds of prescribed sizes.

A green tire which has been determined as being defective at the inspection station 3 is fed to a branched line 6.

All of the foregoing operations are controlled by means of a control system.

Figure 4:
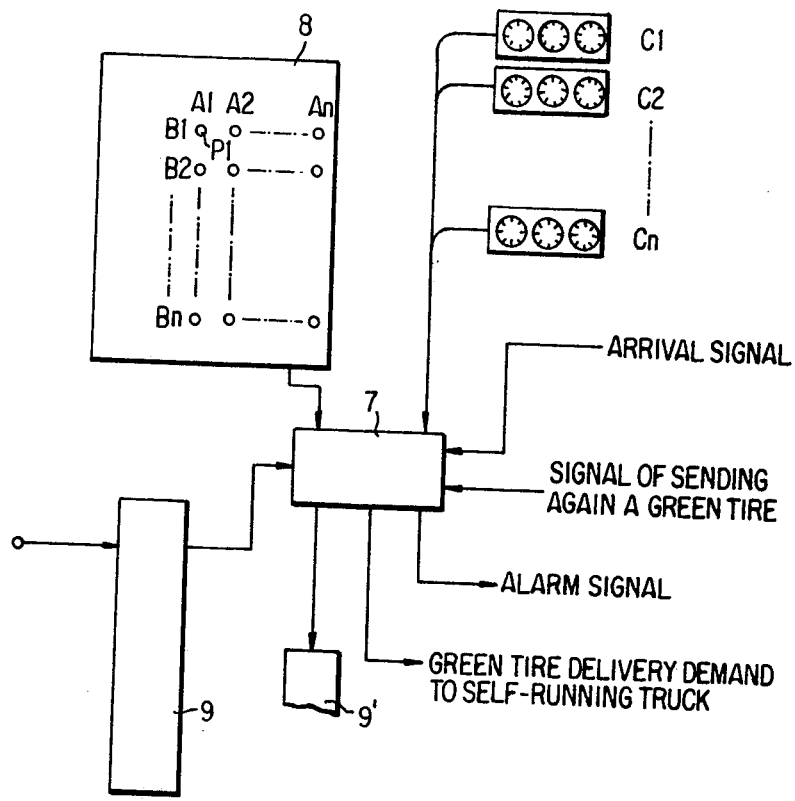
FIG. 4 is a block diagram illustrating the control system used in one embodiment of the present invention.

FIG. 4 illustrates a control system including a centralized controller 7. Call-up time setting panels C-1, C-2, ... C-n are disposed in correspondence with the respective curing machines B1, B2, ... Bn. In each of these time setting panels, the time for moving the automatic truck 2 from the stand-by area, in response to the delivery demand emitted by the curing machine, for withdrawing a green tire of a prescribed size from the storing device and conveying it to the curing machine which has emitted the delivery demand is set (this time being hereinafter referred to as the "call-up time").

Figure 5:
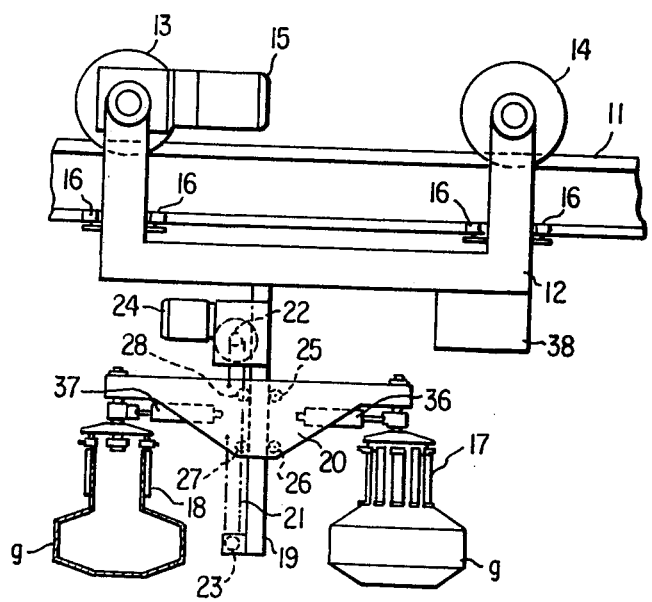
FIG. 5 is a front view showing an example of the conveying truck system that is used in the present invention.
Figure 10:
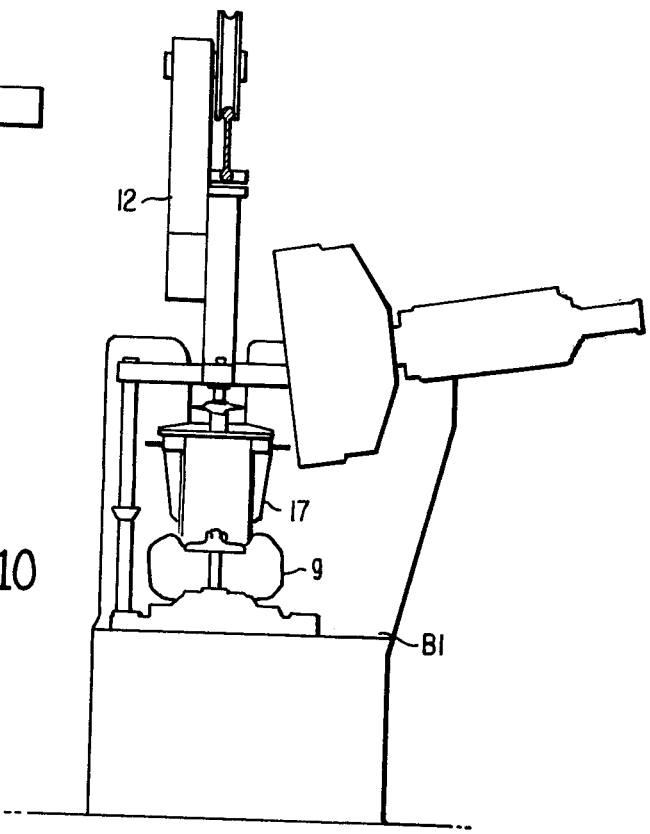
FIG. 10 is a view illustrating the state wherein the green tire is loaded upon the curing machine.

A control device is provided with respect to the curing machines which serves to detect whether a green tire has been treated by the curing machine and also serves to emit a green tire delivery demand signal to a centralized control system 7, if such a tire has been treated. The signal is made by a timer, fixed in each curing machine, when curing operation is finished. According to the signal, the press starts opening motion automatically as is shown in FIG. 10. The timer in the press (curing machine) has an air and electrical function for a changing medium (steam, hot water and cooling water) and generates a signal at a predetermined time. In addition, the timer has another electrical function which generates a demand signal for green tire delivery, taking into consideration running time, inspecting time and painting time. After receiving the signal, the control system serves to detect a storing device A1, A2, ... An corresponding to the curing machine through a setting panel 8 and to check if green tires are or are not stored through a memory device 9. After detecting and checking, the control system 7 sends a signal to a control device 38 fixed to a truck 12 as shown in FIG. 5. Then the truck 12 automatically moves to the corresponding storing device to pick up a green tire stored therein. Thereafter, the truck 12 also moves to the curing machine passing through inspection and coating steps, automatically, by means of the control device 38.

The setting panel 8 is a pin board for determining the correspondence between the curing machine and the building machine. For example, in case the size of the mold of the curing machine B1 is in agreement with the building machine A1, when the pin is set at a position P1, the centralized controller 7 instructs the conveying truck 2 to move to the position of the building machine A1.

The number of green tires shaped by means of the building machines A1, A2, ... An and stored in the storing devices A'1, A'2, ... A'n is stored in a memory device 9.

More specifically, during the green tire shaping step, by operating a switch (not shown) every time an operator places a tire on the conveyor of the storing device, the number of green tires processed is stored in the memory device 9 in order to determine the storage state, and such data is referred to when delivery instructions are emitted to the automatic trucks.

A logging typewriter 9', for maintenance of the manufacturing process, stores information concerning the manufacturing of the building machines, information concerning the delivery of green tires, and information concerning defective tires, from signals emitted from the centralized controller 7.

An automatic truck 2 will now be described.

Figure 6:
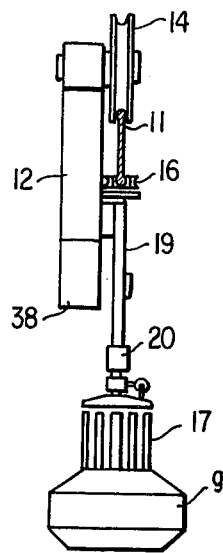
FIG. 6 is a side view of the conveying truck system shown in FIG. 5.

Referring to FIGS. 5 and 6, rails 11 are suspended from a ceiling or the like at a suitable height along the conveying line 1. A truck 12 is composed of a frame having, for example, an ]-shaped form, and wheels 13 and 14 to be engaged with the upper faces of the rails 11 are attached to the upper end portions of the legs of the truck 12. The truck 12 is caused to automatically run along the rails 11 in the suspended state upon rails 11 by means of a motor 15.

Press rollers 16 are mounted on the truck 12 so as to grip both lower end faces of the rails 11 therebetween.

Vertical loaders 17 and 18, each of which is the same as the conventional vertical loader heretofore used, are disposed so as to dependently support a green tire thereon in a vertical and detachable manner, and both the vertical loaders 17 and 18 are suspended on a lifting and descending arm 20 which is capable of moving along a guide which is vertically secured to the truck 12.

A chain 21 for moving the arm 20 up and down is wound on sprockets 22 and 23 rotatably fixed to the upper and lower end portions of the guide 19 and both ends of the chain 21 are fixed to the upper and lower end portions of the lifting and descending arm 20. The sprocket 22 is driven and rotated by means of a motor 24 so as to move the chain 21 up and down, and by this vertical movement of the chain 21, the lifting and descending arm 20 is moved up and down.

Guide rollers 25, 26, 27 and 28 are rotatably supported on the lifting and descending arm 20 so that the guide 19 is located between these rollers.

Any one of the known vertical loaders, including paddle trolley assemblies or link mechanisms, can be used as the vertical loader in the present invention.

A vertical loader including paddle trolley assemblies will now be described by reference to FIG. 7.

Figure 7:
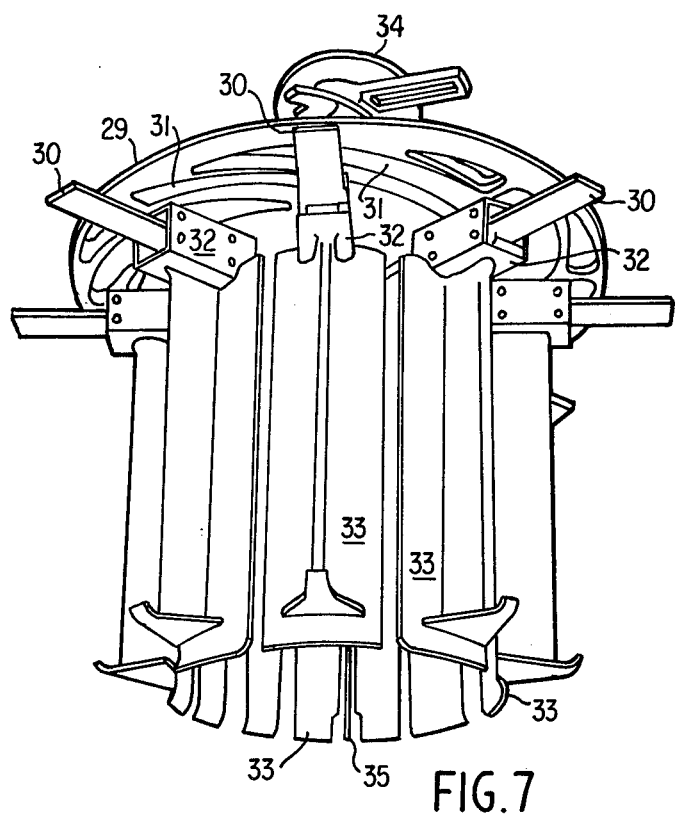
FIG. 7 is a perspective view illustrating an example of the vertical loader to be supported by the conveying truck.

The vertical loader shown in FIG. 7 includes a rotary cam plate 29, a plurality of fixed plates 30 which extend in the radial direction, movable members 32 guided by means of grooves 31 formed spirally on the rotary cam plate 29 and capable of moving radially along the fixed plates 30, axially extending plates 33 suspended from each moving member 32, a driving and rotating device 34 for rotating the rotary cam plate 29, and a tire-detecting switch 35. When the rotary cam plate 29 is rotated in the counterclockwise direction, as viewed, the movable members 32 are moved toward the center so as to reduce the diameter of the circle formed by the axial plates 33. When the rotary cam plate 29 is rotated in the clockwise direction, as viewed, the diameter of the circle is increased.

The lower end portion of the axial plates 33 are slightly bent outwardly so as to form a bead support trip for gripping green tires.

Figure 8:
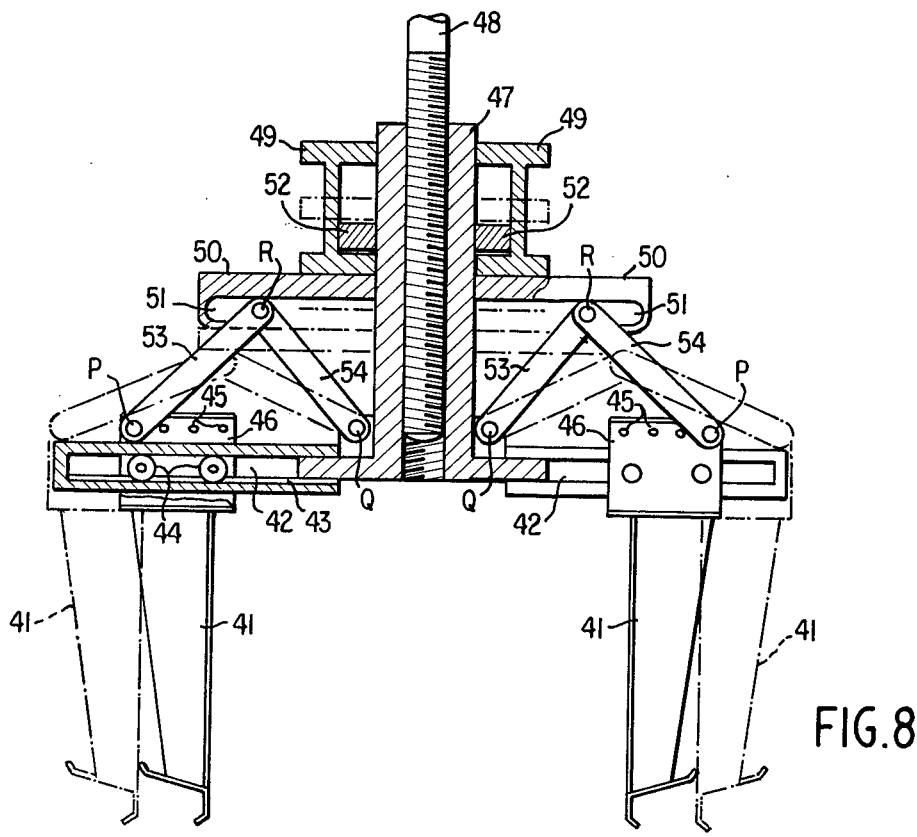
FIG. 8 is a partial sectional view showing another example of the vertical loader.

An example of a vertical loader including a link mechanism will now be described by reference to FIG. 8.

The upper ends of a plurality of tire-holding elements 41 for gripping green tires are slidably supported by means of supporting wheels 44 slidably disposed on a radial projection 43 provided with a guide groove or slot 42, and are fixed onto a fixed plate 46 having a plurality of pin holes 45 formed therein.

The guide groove or slot 42 is formed within the lower end of a guide rod 47 so that the longitudinal direction of the groove 42 corresponds with the radial direction of the gripping device. An adjustment rod 48 is threaded into the guide rod 47, and a frame (not shown) of a charging device is connected to the upper portion of the adjustment rod 48.

A cylinder 49 is movably guided in the vertical direction by the guide rod 47, and a movable plate 50 is fixed to the cylinder 49, an elongated radial slot 51 being formed within the moving plate 50. A piston head 52 is fixed to the guide rod 47 and is disposed within the cylinder 49, the cylinder 49 and the guide rod 47 constituting a piston cylinder device.

Links 53 and 54 are pivotably disposed within one of the pin holes 45 formed on the upper portion of the fixed plate 46 and pivotably connected to the lower part of the guide rod 47 by means of pins P and Q, respectively. These links 53 and 54 are also pivoted and connected to each other within slot 51 by means of a pin R.

When a compressed fluid is introduced into the lower portion of the cylinder 49 by using a suitable pressure source, the cylinder 49 is moved downwardly along the guide rod 47. With the downward movement of the cylinder 49, the movable plate 50 is also moved downwardly. Accordingly, the pivoted portions of the links 53 and 54 supported in the slot 51 are moved radially outwardly in the slot 51 while the entire height of the link mechanism is gradually decreased. With this movement, link 54 pivoted to the fixed plate 46, and the tire-gripping elements, are moved radially outwardly within groove or slot 42 while maintaining the prescribed horizontal height.

In the foregoing manner, the tire-gripping elements 41 are radially expanded outwardly from the center while maintaining the prescribed horizontal height.

When green tires, having a size different from the size of the green tires gripped in the preceding operation, are gripped, the adjustment in the radial direction is performed by selecting an appropriate pin hole 45 for insertion of the pin P among the plurality of pin holes 45 formed on the fixed plate 46, and the adjustment in the vertical direction is accomplished by turning the adjustment rod 48.

Referring to FIG. 5 again, cylinders 36 and 37 are disposed so as to rotate the driving device 34 for rotating both vertical loaders 17 and 18.

The control device 38 is fixed to the truck 12 so as to control the forward and reverse rotations of the driving motor 15 (and therefore the movement of the truck 12), the forward and reverse rotations of the motor 24 (and therefore the movement of the vertical loaders 17 and 18), and the elongation and contraction of the cylinders 36 and 37 (and therefore the increase and decrease of the diameter of the circle formed by the axial plates 33) in response to a control signal.

In the structure illustrated hereinbefore, the sizes of the molds of the curing machines B1, B2, ... Bn correspond to the sizes of the molds of the building machines A1, A2, ... An, respectively, and this corresponding relationship is determined by the setting panel. The automatic trucks 2, 2′, ... are made to stand by, as shown in FIG. 3, at a stand-by position indicated by the dotted line G. Call-up times determined according to the curing machines B1, B2, ... Bn are set in the respective call-up time setting panels.

Assuming that the curing machine B1 emits a demand signal for the delivery of a green tire, in response to this signal the setting panel 8 instructs the centralized controller 7 to feed a green tire shaped by the building machine A1 and stored in the storing device A1′ to the curing machine B1.

On receipt of this instruction, the quantity and kinds of stored green tires shaped by the building machine A1 is confirmed based on the data stored in the memory device 9, and when it confirmed that the prescribed amount is stored, an order for moving one of the automatic trucks 2 is given to the control device 38 of one of the trucks 2 and the motor 15 is started so as to drive the truck 2 toward the storing devices. When the truck 2 arrives at the prescribed storing device A1′, a sensor (not shown) mounted on the storing device A1′ is actuated so as to alter the switching of the rail to 40-A and feed the truck 2 along the rail 40-A to the point just above a green tire of the storing device A1′.

Then, the cylinder 36 is operated to diminish the diameter of the circle formed by the axial plates 33, and the motor 24 is also driven, whereby the lifting and descending arm 20, that is, the vertical loader 17, is inserted into the green tire g.

When bead support lips of the axial plates 33 are disposed within the lower portion of the green tire g so as to engage the bead thereof, the tire detecting switch 35 is actuated so as to impart a signal to the control device 38 or the control system, whereby the motor 24 is stopped in order to halt the vertical loader 17.

Then, the cylinder 36 is operated in the direction reverse to the direction described above so as to expand the diameter of the circle formed by the axial plates 33, and the bead of the green tire g is supported from below by the bead support lips so as to maintain the green tire g thereon.

Then, the motor 24 is driven and the arm 20 moved upwardly. At this point, the bead support lips are caught by the bead of the green tire g and they are lifted together with the green tire g. When the green tire g is lifted up to a suitable height, the motor 22 is stopped.

On completion of the loading of the green tire g, the rail 40-A is changed over to rail 1 and the truck 2 is returned to the conveying line 1. Then, the truck 2 moves to the inspection station 3 where the green tire is inspected with the naked eye of an operator.

In this case, the green tire is inspected while being suspended on the vertical loader.

When the green tire is judged as being good as a result of the inspection, the truck 2 moves again and stops at the coating device 4 where the inner face of the green tire is coated.

Figure 9:
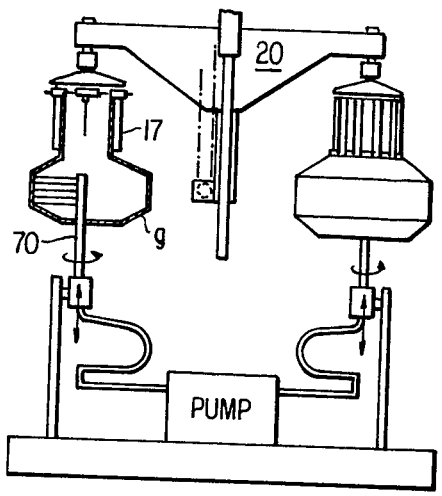
FIG. 9 is a schematic view illustrating the green tire coating step.

As is shown in FIG. 9, a coating nozzle 70 is inserted upwardly through the hole within the lower portion of the green tire g suspended on the vertical loader 17, and coating is performed while rotating the coating nozzle 70. After completion of the coating operation, the green tire is fed to the preheater 5 and then to the curing machine B1.

When a sensor (not shown) detects the arrival of the truck 2 at the curing machine B1, the truck 2 is stopped, and the rail 1 is changed over to rail 40-B so as to move the truck 2 to the curing machine B1. When the automatic truck 2 arrives at the point just above the mold of the curing machine B1, the truck 2 is stopped.

After the truck 2 is stopped, the motor 24 is driven so as to lower the arm 20, whereby the green tire g is loaded onto the mold of the curing machine B1 as shown in FIG. 10.

Then, the cylinder 36 is driven so as to decrease the diameter of the circle formed by the axial plates 33, and the arm 20 is lifted up again so as to retract the axial plates 33 from the green tire g. Then, the arm 20 is stopped again.

Subsequently, the truck 2 from which the green tire g has been withdrawn is returned to the stand-by area through points j, k and l.

Incidentally, when the conveying truck 2 arrives at the prescribed curing machine, an arrival signal is given to the centralized controller 7, however, in case the conveying truck does not arrive at the prescribed curing machine within a prescribed time set by the call-up time setting panel, the centralized controller 7 emits an alarm signal.

In case the green tire is judged as being defective at the inspection station, a switch (not shown) is depressed so as to introduce the truck 2 into the branched line 6 from the point m and move it to the defective tire storing area, where the defective tire is withdrawn from the truck. A sensor is disposed midway between point m and the defective tire storing area in order to detect the transmission of this defective tire carried on the truck and to emit a signal, for sending another green tire of the same size to the prescribed curing machine, to the centralized controller 7.

On receipt of this signal, the prescribed loading and withdrawal positions are memorized on another automatic truck 2′ (or 2) by the centralized controller 7, and the truck 2′ is caused to move to the prescribed loading position.

The subsequent operations are conducted in the same manner as described above.

When a green tire-demanding signal is emitted from another curing machine Bj (j=1, 2, 3, ...), the corresponding building machine Ai (i=1, 2, 3, ...) is determined by the setting panel 8 and the destinations Ai and Bj are programmed into the automatic truck, and the truck travels between Ai and Bj in the same manner as described above.

Figure 12:
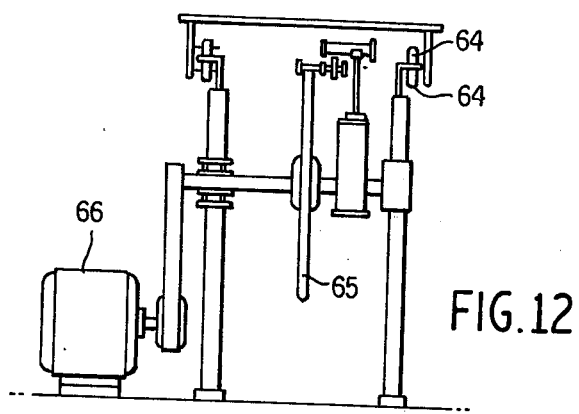
FIG. 12 is a side view showing the storing device shown in FIG. 11.
Figure 13:
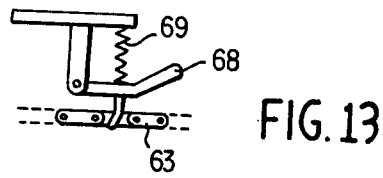
FIG. 13 is a front view showing the relation between the pawl and chain in the arrangement shown in FIG. 11.
Figure 11:
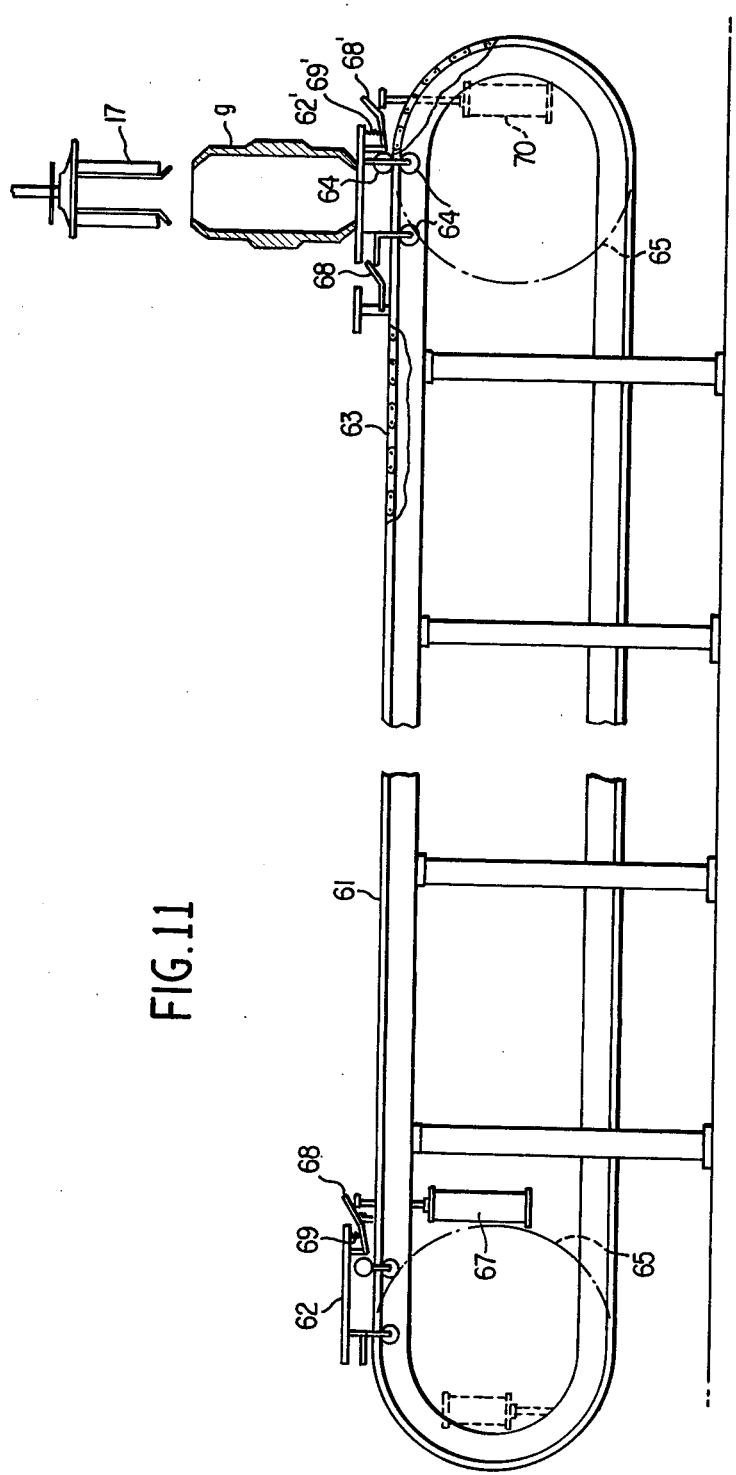
FIG. 11 is a front view showing an example of the green tire storing device.

An embodiment of the storing device of the building machine is illustrated in FIGS. 11, 12 and 13. The storing device comprises a frame 61, trucks 62, 62′, a chain 63, and a chain-driving member 66. The angle or web of the frame is gripped by wheels 64 so as to support the truck 62. The chain 63 is laid between sprockets 65 mounted on the left and right sides of the frame 61 and driven by the driving member 66. When a building machine operator vertically moves a green tire onto a loading stand on the truck 62 and depresses a switch (not shown), a cylinder 67 on the left side of frame 61 is moved downwardly, and a nail member 68 of the truck 62 is biased downwardly by a spring 69 so that the nail member 68 is engaged with the chain 63 and the advancing movement is started. When the nail member 68 impinges against a truck 62' stopped on the right side of the frame 61, the nail member 68 is lifted up and disengaged from the chain 63, whereby movement of the nail member 68 ceases. On the right side of the frame 61, a green tire g is loaded on the vertical loader 17 of the automatic truck. At this point, a cylinder 70 on the right side of frame 61 is moved downwardly and a nail member 68' is biased downwardly by a spring 69' so that the nail member 68' is engaged with the chain 63. Accordingly, only one truck 62' passes around the right side portion of the frame 61 with the movement of the chain 63 and through the lower portion of the frame 61 so as to be forwarded to the left portion of the frame 61.

As will be apparent from the foregoing illustration, according to the present invention, all the steps for conveying the green tires from the building machines to the curing machines can be performed consistently in one line and no operator is required at all of these steps except the inspection station. Furthermore, by using a computor as the centralized controller, it is possible to deliver green tires of the prescribed size to prescribed curing machines with a good operation time and log data necessary for control and maintenance of the manufacturing process.

Still further, by performing the delivery of green tires with the use of automatic trucks that can automatically operate independently from one another, information or instructions for the delivery of the green tires can be divided between respective truck units. Accordingly, the content of the information or instructions can be simplified and the structure of the data processing device can also be simplified.

Obviously, many modifications and variations of the present invention are possible in light of the above teachings. It is to be understood therefore that within the scope of the appended claims, the present invention may be practiced otherwise than as specifically described herein.

What is claimed as new and intended to be secured by Letters Patent of the United States is:

1. A conveying method for withdrawing green tires from storing devices for storing green tires, disposed near building machines, conveying them to curing machines while held on conveying apparatus, and loading them onto the curing machines, comprising the steps of:

sending a first green tire delivery demand signal from a particular curing machine of a plurality of curing machines, to a control system which stores the relationships between each of the curing machines and the corresponding respective storing devices, and the quantities and kinds of green tires stored in the storing devices, each curing machine having a timing means set for that particular machine which sends the demand signal to the control system in advance of the curing time of a green tire is completed in the machine, taking into consideration the time it takes to deliver a green tire from a storing device through various intermediate stages and to the machine, whereby the machine receives a green tire to be cured immediately upon completion of curing of a preceeding tire and without a waiting time;

sending a second signal from the control system which receives said first demand signal for indicating the curing machine which has emitted the green tire delivery demand signal and the corresponding storing device, to an automatic truck supporting and carrying thereon a mechanism having the function of withdrawing a green tire from one of the storing devices, suspending it thereon, and carrying and loading it onto one of the curing machines, said automatic truck having control means responsive to said second signal for operating the automatic truck, and said automatic truck running on rails laid and supported at a suitable height above said storing devices and said curing machines; and on receipt of said second signal, moving said automatic truck to said corresponding storing device for picking up a green tire therefrom;

automatically operating conveying means at each storing device to deliver a green tire from the storing device to the truck in response to arrival of an automatic truck at the storing device to pick up a green tire from the storing device; and suspending the green tire on the automatic truck, moving said automatic truck to said particular curing machine, and loading the green tire onto the particular curing machine.

2. A conveying method according to claim 1 which further comprises:

setting a call-up time into said control system so that if said automatic truck does not arrive at the prescribed curing machine within the set call-up time, an alarm signal is emitted.

3. A conveying method according to claim 1, which further comprises:

maintaining a plurality of automatic trucks at a standby station prior to receiving the second signal from the control system for delivery of a green tire.

4. A conveying method according to claim 1, which further comprises:

returning the automatic truck to a stand-by station after said automatic truck has loaded the green tire onto the curing machine.

5. A conveying method according to claim 1, wherein:

the automatic truck is automatically switched to another rail when it arrives at a storing device and is fed along said another rail to a point just above a green tire in the storing device.

6. A conveying method according to claim 1, wherein:

each storing device includes a separate conveying means extending between a building machine and a position for cooperation with an automatic truck arriving at the storing device for picking up a green tire therefrom, said conveying means operating automatically in response to an automatic truck picking up a green tire therefrom to position another green tire for delivery to an automatic truck arriving at the storing device.

* * * * *